Figure 2:
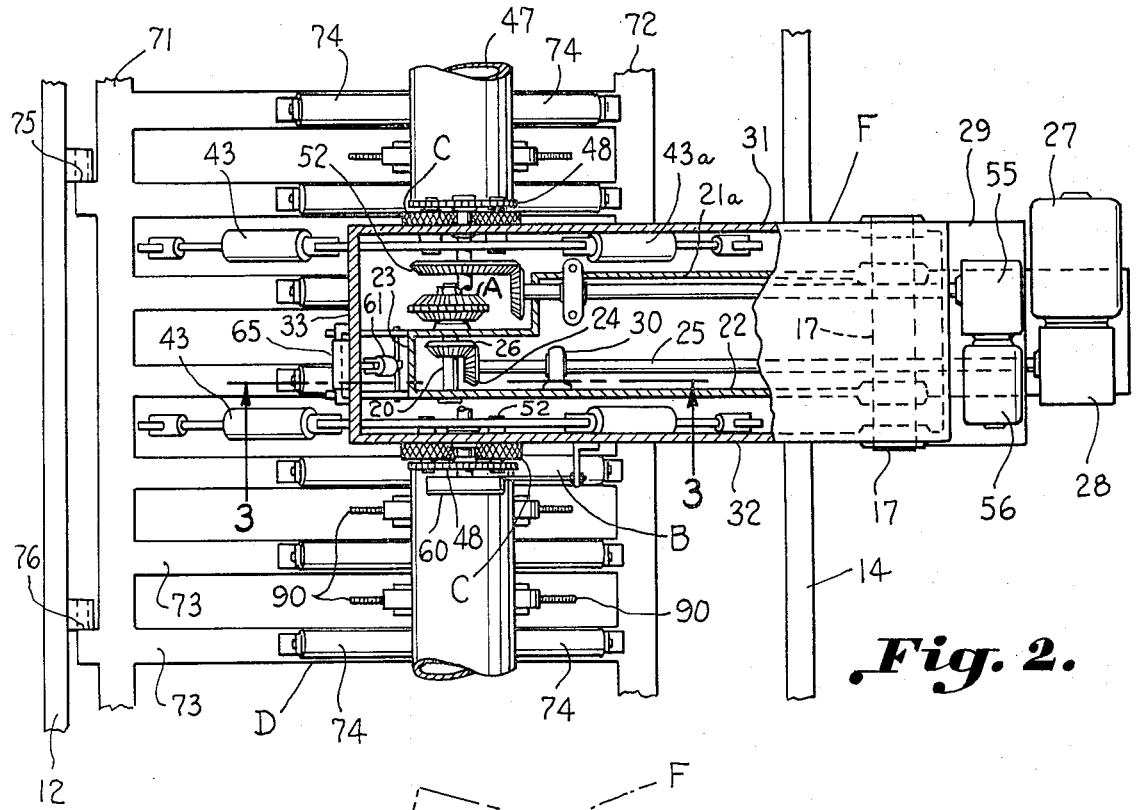

United States Patent [19]
George, Jr.

[11] 3,820,424
[45] June 28, 1974

[54] PIPE CUTTER

[76] Inventor: John S. George, Jr., 313 Bethel Dr., Mauldin, S.C. 29662

[22] Filed: Oct. 17, 1972

[21] Appl. No.: 298,283

[52] U.S. Cl. .............................................. 82/101
[51] Int. Cl. ................................................ B23b 3/04
[58] Field of Search ............ 82/46, 47, 83, 86, 101, 82/102

[56] References Cited
UNITED STATES PATENTS

| | | | |
|---|---|---|---|
| 2,272,179 | 2/1942 | Allardt | 82/83 |
| 2,459,068 | 1/1949 | Eastwood | 82/101 X |
| 2,771,662 | 11/1956 | Ziska | 82/83 |
| 2,903,934 | 9/1959 | Mongolf et al. | 82/101 X |
| 3,107,564 | 10/1963 | Coker et al. | 82/101 |
| 3,257,881 | 6/1966 | Davis | 82/101 X |
| 3,289,506 | 12/1966 | Morsbach et al. | 82/101 X |
| 3,451,295 | 6/1969 | Shallenberg | 82/86 |

FOREIGN PATENTS OR APPLICATIONS

| | | | |
|---|---|---|---|
| 1,198,996 | 7/1970 | Great Britain | 82/101 |

*Primary Examiner*—Harrison L. Hinson
*Attorney, Agent, or Firm*—Bailey & Dority

[57] ABSTRACT

A pipe cutter for cutting pipes which includes a rotatable cutter head. Pivotal arms engage the pipe for holding the pipe in contact with the cutter head. Drive rollers rotate the pipe so that such can be cut circumferentially therearound. The pipe is fed under the cutting head on a conveyor which is hinged so that such can be lowered. When the conveyor is lowered the pipe is supported on support rolls.

4 Claims, 4 Drawing Figures

PATENTED JUN 28 1974 3,820,424

SHEET 1 OF 2

PIPE CUTTER

This invention relates to a pipe cutter, and more particularly to a pipe cutter which is capable of cutting various size pipes while preparing two pipe ends for subsequent welding.

It is essential in welding pipes that the ends of the pipes be properly prepared, such as by providing them with the desired bevel and land dept. One suitable method heretofore used in preparing the ends of such pipe is flame cutting. While the efficiency of flame cutting is satisfactory, the quality of a machine bevel is far superior to a bevel produced by flame cutting. Lathes have also been utilized in cutting pipes and preparing the ends, however, such is not generally satisfactory in that the preparation of the end of the pipe depends on the roundness of the pipe. That is, while the bevel may be satisfactorily produce on a lathe the consistency of the land size is only as true as the roundness of the pipe.

The apparatus constructed in accordance with the present invention prepares two ends of pipe in one cutting revolution and the consistency of the preparation of the end of the pipe is not dependent on the roundness of the pipe since the pipe is clamped and driven by drive rollers riding on the outside of the pipe. This regulates the depth that the cutter head cuts into the pipe and makes this depth constant in relation to the outside of the pipe, rather than the center axis.

The apparatus constructed in accordance with the present invention is also versatile in that it can handle extremely heavy pipes. One particular cutting apparatus is capable of cutting pipes having sizes ranging from 3½ inches outside diameter to 24 inches outside diameter.

Accordingly, it is an important object of the present invention to provide an apparatus for cutting pipes and the like, which prepares two ends of pipe while cutting the pipe.

Another important object of the present invention is to provide a pipe cutting apparatus which cuts and prepares the ends of pipe with a bevel and land even when the pipe is not perfectly round.

Another important object of the present invention is to provide a pipe cutting apparatus in which heavy large diameter pipes may be readily cut and the ends prepared for subsequent welding.

Still another important object of the present invention is to provide a pipe cutting apparatus which is very versatile in that it can cut pipes of various sizes and weights.

Still a further object of the present invention is to provide a pipe cutting apparatus wherein, accurate depth cuts can be made in pipes and the like.

The construction designed to carry out the invention will be hereinafter described, together with other features thereof.

Figure 1:
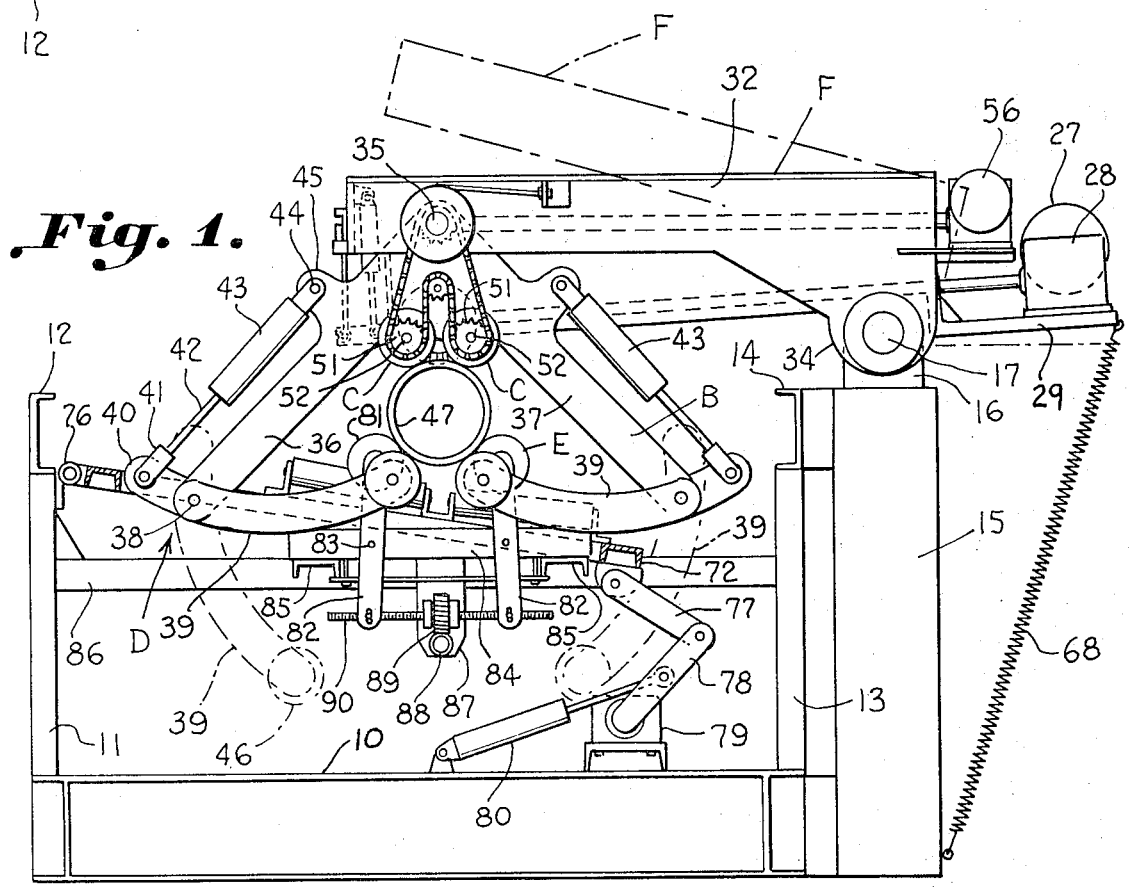
Figure 3:
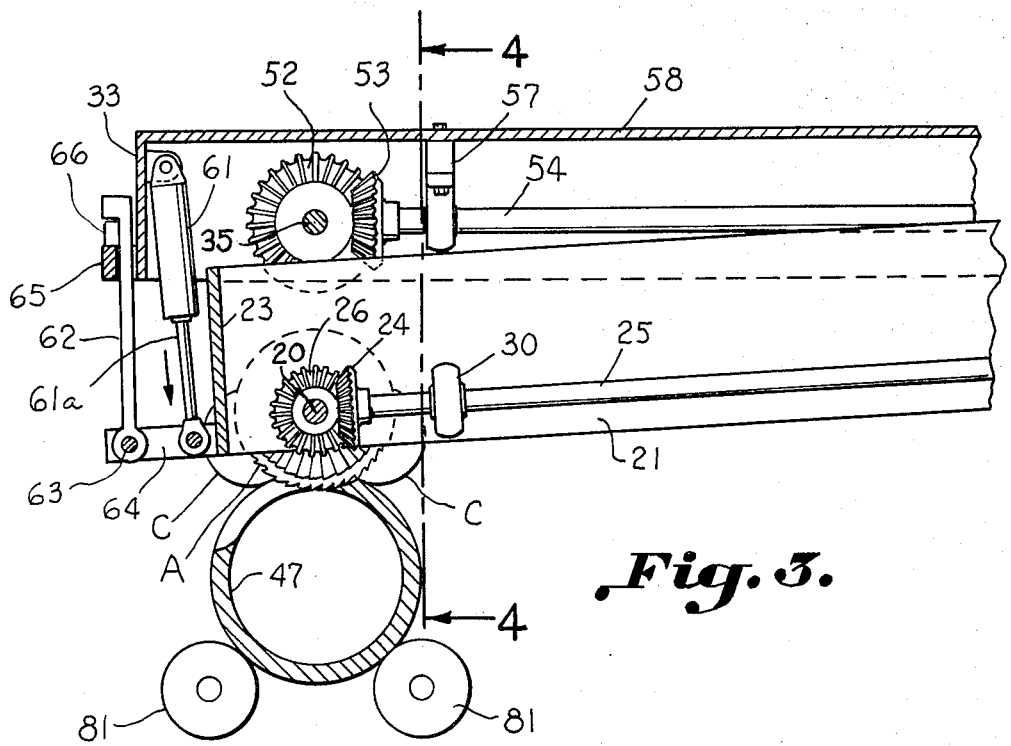
Figure 4:
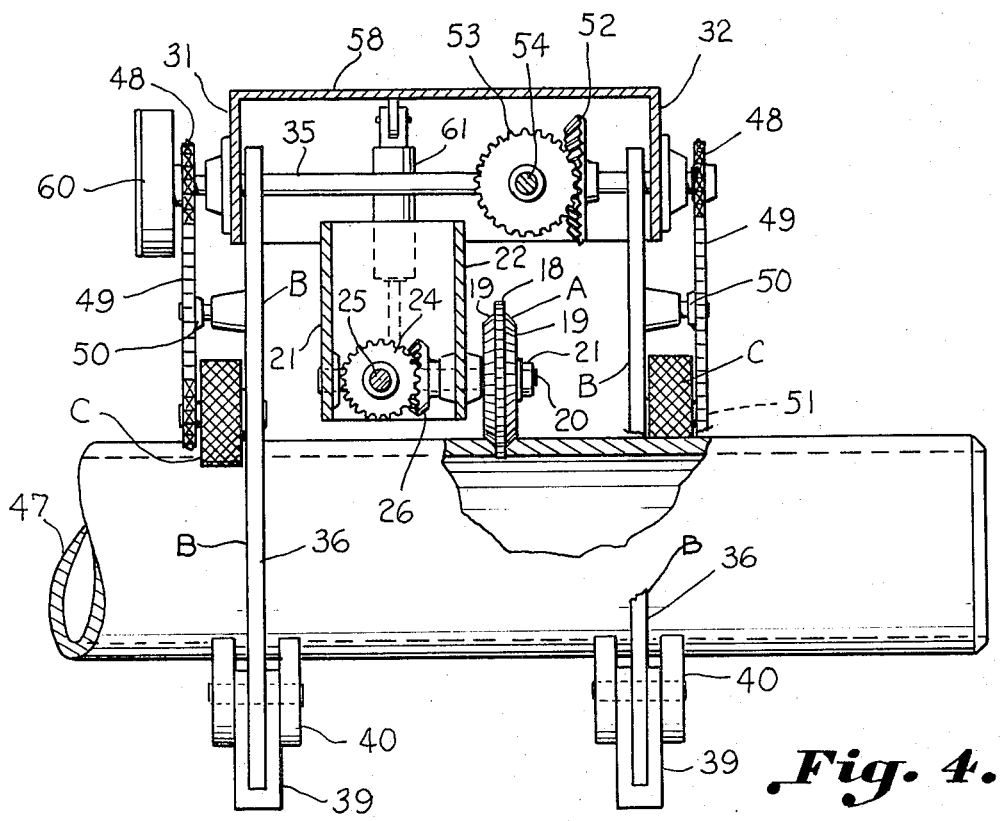

The invention will be more readily understood from a reading of the following specification, and by reference to the accompanying drawings forming a part thereof wherein, and example of the invention is shown and wherein:

FIG. 1 is an elevational view, partially in section, illustrating the pipe cutting apparatus constructed in accordance with the present invention, FIG. 2 is a plan view, with parts removed for purpose of clarity, illustrating a pipe cutting apparatus of FIG. 1, FIG. 3 is a sectional view taken along line 3—3 of FIG. 2, and FIG. 4 is a sectional view taken along line 4—4 of FIG. 3 illustrating a portion of the cutting assembly.

Referring in more detail to the drawings, there is illustrated an apparatus for cutting pipe and the like comprising a rotatable cutting head A. Means is provided for rotating the cutting head. Spaced pivotal arms B are provided for engaging the pipe and holding the pipe in contact with the rotatable cutting head A during the cutting operation. Drive rollers C engage the pipe and as they are rotated the pipe is rotated for permitting the cutting head A to circumferentially cut around the pipe. A conveyor means D extends under the cutting heads A for transporting the pipe to the cutting head A. Supporting members E are carried under the conveyor means D for supporting the pipe when the conveyor means is lowered. The cutting head A and the pivotal arms B are carried on a supporting arm F which is pivotally supported adjacent one end so that such can be raised and lowered.

The basic framework for the cutting apparatus is composed primarily of channel and angle iron arranged in such a manner as to both support and surround the conveyor system D, as well as the pivotal supporting arm F. The framework includes a plurality of horizontal channel members 10 spaced longitudinally along a conveyor system which is suitably supported on the floor. Adjacent one end of the channel members 10 are vertical supporting members 11 which have an elongated channel member 12 welded to the top thereof. Similar vertical supporting standards 13 are welded adjacent the other ends of the horizontal frame members 10 and, also have an elongated channel member 14 welded to the upper ends thereof. The vertical post 15 is suitably welded to the frame members 10 and 14 for supporting the supporting arm F. Positioned on top of the vertical post 15 are vertical protrusions 16 through which an enlarged pivot pin 17 extends for securing the pivotal supporting arm F thereto. Such is described in more detail below.

Referring to the cutting head A, such may be any conventional suitable cutter and the one disclosed in the preferred embodiment for preparing the ends of the pipe includes a straight cutter 18 with beveled cutters 19 positioned on opposite sides thereof. These cutters are, in turn, are secured to a shaft 20 by means of a nut 21 and washers. The shaft 20 extends through one side 21 of a pivotal housing. The pivotal housing includes another vertical side 22 spaced therefrom. In order to avoid certain gears the side 21 extends laterally and then rearward forming the rear side plate 21a, such as illustrated in FIG. 2. The outer ends of the side walls 21 and 22 are joined by end wall 23. The inner end of the side walls 22 and 21a has a hole extending therethrough, through which the enlarged pin 17 passes for allowing the cutter head which is carried by the side walls 21 and 22 to be raised and lowered and pivot about the shaft 17.

The shaft 20 upon which the cutter head A is carried is driven by means of a gear 24 carried on the shaft 25 which meshes with gear 26 carried on the cutter head shaft 20. The shaft 25 upon which gear 24 is carried is, in turn, driven by a D.C. electric motor 27 through a cutter reduction gear box 28. It is noted that the D.C. electric motor and cutter reduction gear box are, in turn, supported on a platfrom 29 carried on the opposite side of the pivotal pin 17 for counterbalancing the supporting arm F. Suitable bearing blocks 30 are provided for journalling the shaft 25 and securing such to the side wall 22.

The pivotal arms B are supported on the pivotal supporting arm F which includes a pair of spaced vertical side walls 31 and 32 which are joined by an outer vertical wall 33. The inner ends of the side walls 31 and 32, in turn, have downwardly extending legs 34 thereon, with holes extending therethrough for permitting the enlarged pin 17 to pass therethrough. The entire supporting arm F is permitted to pivot about the pin 17.

There are two pivotal arms B provided for the cutting apparatus. One is carried adjacent each of the side walls 31 and 32 on a shaft 35 (FIG. 4) which extends through the side walls 31 and 32 of the supporting arm F. Each of the pivotal arms B includes an inverted V-shaped member defined by diverging arms 36 and 37, which are journalled adjacent the apex thereof on the shaft 35. Journalled adjacent the lower end of the arms 36 by a pin connection 38 are arcuate arms 39. Rollers 46 are carried on the outer end of the arcuate arms 39 for engaging the pipe 47 during the cutting operation. Each of the arcuate arms 39 has a portion 40 which extends beyond the pivotal connection 38 for receiving a coupling 41 which, in turn, is connected to a piston 42 extending out of the hydraulic cylinder 43. The other end of the hydraulic cylinder 43 is pivotally connected by means of a pin 44 to an outwardly extending boss 45 carried by the arms 36 and 37. The hydraulic cylinder 43 is a double acting cylinder and the hose connections therefor are not shown for purposes of clarity.

It can be seen that the pivotal arms B can be manipulated by the hydraulic cylinders 43 from an open position shown in phantom lines in FIG. 1 to a closed position shown in full lines in FIG. 1, wherein such engages the pipe 41 being cut. The rollers 40 carried on the ends of the arcuate arms 39 engage the pipe forcing such tightly against the drive rollers C.

The drive rollers C are driven off of the rotating shaft 35. Connected adjacent each outer end of the shaft 35 is a sprocket 48 around which a chain 49 extends. The chain passes around an idler roller 50 and sprockets 51 carried on shafts 52. Also, carried on shafts 52 are knurled steel drive rollers C. The inner ends of shafts 52 are journalled on inwardly extending projections carried by the arms 36 and 37 of the inverted V-shaped member.

The purpose of the knurled steel rollers C are to engage the surface of the pipe 47 being cut for rotating the pipe while the cutting head A severs the pipe.

Rotation is supplied to the shaft 35 by means of miter gears 52 and 53, which are in mesh with each other. The gear 52 is carried on the shaft 35, while gear 53 is carried on an elongated shaft 54 extending out of a gear reduction box 55. The D.C. motor 56 is connected to an input of the gear reduction box 55 for rotating the elongated shaft 54, shaft 35 and, in turn, the drive rollers C. The reduction gear 55 and the D.C. motor 56 are also carried on the rearward extending platform 29 to add weight for counterbalancing the supporting arm F. A bearing block 57 is provided for supporting the shaft 54 from a top plate 58 coupled between the side walls 31 and 32 of the supporting arm F. An electric brake 60 is carried on one end of the shaft 35 so as to lock the shaft when energized, which in turn, causes the knurled roller C to hold the pipe fast. The purpose of this is that when the initial cutting operation takes place before the pipe 47 is permitted to rotate the cutter A must cut through the entire surface of the pipe. After the cutter A cuts through the pipe then the electric brake 60 is released, allowing the shaft 35 to drive the knurled rollers C to rotate the pipe. Normally, only one revolution of the pipe is desired for the cutting operation.

In order to initially lower the cutting head into the pipe a hydraulic cylinder 61 is connected between the outer side wall 23 of the housing in which the cutter head is carried and the outer side wall 33 of the main housing of the pivotal supporting arm F. The hydraulic cylinder 61 is a double-acting hydraulic cylinder and the hose connections thereto are not shown for purpose of clarity. The depth that the cutter head can cut into the pipe 47 is controlled by a depth gauge which consists of a vertical L-shaped member 62 which has its lower end connected by a pin 63, carried by an outwardly extending member 64 that is welded to the side wall 23 of the cutter head housing. It is noted actually that the hydraulic cylinder 61 also has its piston rod 61a coupled to the outward extension 64. A U-shaped member 65 extends outwardly from the end wall 33 of the main pivotal supporting arm F so as to define a gap 66 between the upper portion of the L-shaped member 62 and the U-shaped member 65. Into this gap various gauge blocks may be inserted for controlling the depth that the cutter head housing may be lowered relative to the main pivotal arm F.

Prior to initiating the cutting operation the hydraulic cylinder 61 is retracted, raising the cutter head. When it is desired to initiate the cutting operation, as previously mentioned, the electric brake 60 is energized and the hydraulic cylinder 61 is activated causing such to force the cutting head downwardly into the pipe. The rotating cutting head A cuts through the surface of the pipe. Upon penetrating the pipe the electric brake 60 is released and the drive rollers C rotate the pipe to complete the cutting operation.

As can be seen in FIG. 1, a spring 68 extends from adjacent the bottom of the vertical column 15 to the outer edge of the rearwardly extending platform 29 of the supporting arm F for tending to raise the supporting arm to the phantom position. It is, of course, to be understood that other means may be utilized for raising the supporting arm F and in one particular embodiment, the roller 46 carried on the inner arcuate arm 39 is permitted to engage a cross supporting brace which extends between the vertical posts 11 and 13 for raising the support arm F as said pivotal arms B are extended to the open position.

Frequently, the steel pipes being cut are extremely heavy therefore, a conveyor means D is positioned directly beneath the cutter head A for transporting the pipe thereto. In the embodiment illustrated in FIGS. 1 and 2 the conveyor means D includes a bed defined by a pair of laterally spaced elongated channel members 71 and 72 which are joined by spaced cross members 73. Conventional rollers 74 are carried on the cross members 73 for supporting the pipe when the conveyor bed is in a raised position. It can be seen in FIG. 2 that the channel member 71 is hinged by couplings 75 and 76 to the side channel member 12. The other side of the conveyor bed is connected to a linkage (FIG. 1) including linkage arm 77 which is, in turn, connected to linkage arm 78 having its lower end pivotally connected to a support block 79 carried on the horizontal base member 10. A hydraulic cylinder 80 is coupled between the horizontal member 10 and the linkage 78 for extending the linkage arms 77 and 78 vertically to raise the conveyor bed. When the piston associated with the hydraulic cylinder 80 is extended the linkage is lowered, lowering the conveyor bed. The hoses for the hydraulic cylinder 80 are not shown for purpose of clarity.

The supporting members E which include rollers 81 are carried on the upper end of spaced vertical arms 82. The vertical arms 82 are pivotally connected adjacent their center by a pin 83 to a horizontal support bar 84. The horizontal support bar 84 is, in turn, supported on longitudinally extending spaced channel members 85 which are, in turn, attached to a laterally extending cross-brace 86 which extends between the vertical members 11 and 13. Extending downwardly from the cross member 84 is a plate 87 which has an elongated worm shaft 88 extending therethrough. This worm shaft extends the length of the conveyor system and engages spaced worm gears 89 which are, in turn, fixed to a shaft 90. The shaft 90 is a threaded shaft and has nuts (not shown) carried thereon to which the lower end of the vertical members 82 are attached. By rotating the shaft 88 which, in one particular instance is coupled to the output of an electric motor, the worms 89 are rotated, in turn, rotating the shafts 90. This causes the lower ends of the vertical members 82 to be moved in and out. As the lower ends of the vertical members 82 are moved in and out the support rollers 81 are also moved in and out for accommodating various diameter pipes.

In summarizing the complete operation of the machine, the conveyor bed is raised so that the rollers 74 extend above the support rollers 81. The pipe is loaded on the conveyor rollers 74 and rolled under the cutting head assembly.

An electric motor is energized to rotate the longitudinal threaded shaft 88 which rotates the worm gear 89 adjusting the vertical pivotal members 82 so that the support rollers 81 come in contact with the pipe. The hydraulic cylinder 80 is then extended causing the linkage arms 77 and 78 to be compressed, lowering the right-hand side of the conveyor bed, such as illustrated in FIG. 1. As noted the conveyor bed pivots about the hinges 75 and 76. At this time the pipe 47 is supported on the support rollers 81. Hydraulic fluid is then applied to the cylinders 43 causing the pistons 42 associated therewith to be extended forcing the rollers 46 into engagement with the lower side of the pipe. This causes the supporting arm F to be lowered bringing the pipe in contact with the drive rollers C. The electric brake 60 is energized locking the shaft 35. The electric motors 27 and 56 are energized causing the cutter head A to rotate and applying torque to the shaft 35, but since the electric brake 60 is energized such does not rotate. A measured block is placed in the gap 66 to set the depth of the cut. The hydraulic cylinder 61 is then extended lowering the cutting head into the pipe 47. The cutting head A cuts through the pipe to the desired depth set by the gauge inserted in the gap 66. After the cutting head penetrates through the surface of the pipe the electric brake 60 is de-energized allowing the shaft 35 to rotate the knurled rollers C by means of the chains 49. The knurled rollers C rotate the pipe 47 allowing the cutting head A to cut through the pipe in one revolution.

As can be seen in FIG. 4, the straight cutter 18 prepares the land, while the side cutters 19 cuts the bevel on the end of the pipe.

In FIG. 4 it can be seen that a pair of the inverted V-shaped pivotal arms B is utilized for drawing the pipe flush into the cutter head A.

While a preferred embodiment of the invention has been described using specific terms, such description is for illustrative purposes only, and it is to be understood that changes and variations may be made without departing from the spirit or scope of the following claims.

What is claimed is:

1. An apparatus for cutting a pipe and the like comprising
    an elongated bed,
    rollers carried on said elongated bed supporting said pipe and permitting said pipe to be rotated about its longitudinal axis,
    a pivotal supporting member having an outer end extending over said elongated bed,
    drive rollers carried adjacent said outer end of said pivotal supporting member engaging said pipe for rotating said pipe,
    a pair of pivotal arms extending downwardly from said supporting member on opposite sides of said pipe,
    power operated means manipulating said pivotal arms for forcing said drive rollers into engagement with said pipe, and
    a rotatable cutting head carried by said pivotal supporting member for cutting said pipe as said drive rollers rotates said pipe.

2. The apparatus as set forth in claim 1 further comprising, a conveyor means extending under said cutting head for transporting said pipe at a right angle to said cutting head, supporting members carried under said conveyor means adjacent said cutting head, and means for moving said conveyor means and said pipe vertically with respect to one another so that said supporting members engage said pipe for supporting same adjacent said cutting head.

3. The apparatus as set forth in claim 1 wherein said pivotal supporting member includes a first and second pivotal arm,
    said drive rollers being carried by said first pivotal arm for engaging said pipe,
    said rotatable cutting head being carried by said second pivotal arms.
    means for adjusting the position of said second pivotal arm relative to said first pivotal arm for controlling the depth of cut made by said rotating cutting head as said pipe is rotated.

4. The apparatus as set forth in claim 1 wherein said power operated means includes hydraulic cylinders carried between said pair of pivotal arms and said pivotal supporting member for pulling said rotatable cutting head and said drive rollers into contact with said pipe when activated.

* * * * *